(12) United States Patent
Eichorn et al.

(10) Patent No.: US 8,364,520 B1
(45) Date of Patent: Jan. 29, 2013

(54) METHOD FOR MEASURING EFFECTIVENESS OF SAMPLING ACTIVITY AND PROVIDING PRE-MARKET PRODUCT FEEDBACK

(75) Inventors: Matthew Patrick Eichorn, Chicago, IL (US); Nathan Thomas Mirabito, Chicago, IL (US); Tony Lee Koenigsknecht, Austin, TX (US)

(73) Assignee: Freeosk Marketing, Inc., Chicago, IL (US)

( * ) Notice: Subject to any disclaimer, the term of this patent is extended or adjusted under 35 U.S.C. 154(b) by 664 days.

(21) Appl. No.: 12/583,217

(22) Filed: Aug. 17, 2009

Related U.S. Application Data

(60) Provisional application No. 61/089,346, filed on Aug. 15, 2008.

(51) Int. Cl.
*G06Q 30/00* (2006.01)
(52) U.S. Cl. ................... 705/10; 705/7; 705/14
(58) Field of Classification Search ............... 705/7, 10, 705/14
See application file for complete search history.

(56) References Cited

U.S. PATENT DOCUMENTS

| | | | |
|---|---|---|---|
| 5,237,157 A | 8/1993 | Kaplan | |
| 5,303,844 A | 4/1994 | Muehlberger | |
| 5,331,544 A | 7/1994 | Lu et al. | |
| 5,371,346 A | 12/1994 | Menoud | |
| 5,409,092 A | 4/1995 | Itako et al. | |
| 5,415,264 A | 5/1995 | Menoud | |
| 5,440,108 A | 8/1995 | Tran et al. | |
| 5,442,567 A | 8/1995 | Small | |
| 5,445,295 A | 8/1995 | Brown | |
| 5,450,938 A | 9/1995 | Rademacher | |
| 5,490,060 A | 2/1996 | Malec et al. | |
| 5,499,707 A | 3/1996 | Steury | |
| 5,500,514 A | 3/1996 | Venneman et al. | |
| 5,513,117 A | 4/1996 | Small | |
| 5,523,551 A | 6/1996 | Scott | |
| 5,641,050 A | 6/1997 | Smith et al. | |
| 5,650,761 A | 7/1997 | Gomm et al. | |
| 5,652,421 A | 7/1997 | Venneman et al. | |
| 5,686,713 A | 11/1997 | Rivera | |
| 5,687,087 A | 11/1997 | Taggart | |
| 5,701,252 A | 12/1997 | Facchin et al. | |
| 5,728,999 A | 3/1998 | Teicher | |
| 5,734,150 A | 3/1998 | Brown et al. | |
| 5,753,899 A | 5/1998 | Gomm et al. | |
| 5,869,826 A | 2/1999 | Eleftheriou | |
| 5,902,984 A | 5/1999 | Planke | |
| 5,971,273 A | 10/1999 | Vallaire | |
| 6,036,089 A | 3/2000 | Oguchi et al. | |
| 6,105,009 A | 8/2000 | Cuervo | |
| 6,109,524 A | 8/2000 | Kanoh et al. | |
| 6,129,275 A | 10/2000 | Urquhart et al. | |
| 6,345,762 B1 | 2/2002 | Mori | |

(Continued)

OTHER PUBLICATIONS

CVS/pharmacy Unveils Extra Bucks Now; http://info.cvscaremark.com/node/233.

(Continued)

*Primary Examiner* — Nga B. Nguyen
(74) *Attorney, Agent, or Firm* — Seyfarth Shaw LLP

(57) ABSTRACT

There is disclosed herein an improved method for measuring the effectiveness of a sampling event, particularly correlating a product sampling event with the consumer's purchase of a corresponding purchasable product. Preferably, a product sample terminal is employed to identify a consumer, dispense a product sample to the consumer, store data pertaining to the product sampling event, and correlate the consumer's purchase of a corresponding or complimentary product for determining whether the product sampling event converted the event into the consumer's purchasing decisions. Additionally disclosed is a method for soliciting, aggregating, and processing consumer preferences pertaining to product attributes for informing investment decisions with regard to product development.

36 Claims, 9 Drawing Sheets

U.S. PATENT DOCUMENTS

| | | | |
|---|---|---|---|
| 6,367,696 B1 | 4/2002 | Inamitsu et al. |
| 6,427,912 B1 | 8/2002 | Levasseur |
| 6,505,774 B1 | 1/2003 | Fulcher et al. |
| 6,516,997 B1 | 2/2003 | Tanazawa et al. |
| 6,575,362 B1 | 6/2003 | Bator et al. |
| 6,588,664 B2 | 7/2003 | Davies |
| 6,595,342 B1 | 7/2003 | Maritzen et al. |
| 6,595,416 B1 | 7/2003 | Newsome et al. |
| 6,644,547 B1 | 11/2003 | White |
| 6,715,673 B2 | 4/2004 | Fulcher et al. |
| 6,754,559 B2 | 6/2004 | Itako |
| 6,779,719 B2 | 8/2004 | Guindulain Vidondo |
| 6,808,112 B2 | 10/2004 | Jacobi et al. |
| 6,842,115 B1 | 1/2005 | Harris et al. |
| 6,854,642 B2 | 2/2005 | Metcalf et al. |
| 6,865,545 B1 | 3/2005 | Epstein et al. |
| 6,929,179 B2 | 8/2005 | Fulcher et al. |
| 6,944,632 B2 | 9/2005 | Stern |
| 7,031,804 B2 | 4/2006 | Brooke, Jr. et al. |
| 7,036,724 B2 | 5/2006 | Lealao et al. |
| 7,058,581 B1 | 6/2006 | Young |
| 7,108,180 B2 | 9/2006 | Brusso et al. |
| 7,110,954 B2 | 9/2006 | Yung et al. |
| 7,147,152 B2 | 12/2006 | Yoshioka et al. |
| 7,213,755 B2 | 5/2007 | Newsome et al. |
| 7,264,156 B2 | 9/2007 | Lealao et al. |
| 7,290,705 B1 | 11/2007 | Shin |
| 7,299,109 B2 | 11/2007 | Juds et al. |
| 7,357,302 B2 | 4/2008 | Black et al. |
| 7,357,314 B2 | 4/2008 | Kusakawa |
| 7,379,890 B2 | 5/2008 | Myr et al. |
| 7,389,919 B2 | 6/2008 | Walker et al. |
| 7,398,921 B2 | 7/2008 | Zito, Jr. |
| 7,415,426 B2 | 8/2008 | Williams et al. |
| 7,428,987 B2 | 9/2008 | Ota et al. |
| 7,444,296 B1 | 10/2008 | Barber et al. |
| 7,455,223 B1 | 11/2008 | Wilson et al. |
| 7,458,510 B1 | 12/2008 | Zhou |
| 7,464,867 B1 | 12/2008 | Kolls |
| 7,510,116 B2 | 3/2009 | Robb et al. |
| 7,513,414 B1 | 4/2009 | Block et al. |
| 7,516,881 B1 | 4/2009 | Block et al. |
| 7,516,887 B2 | 4/2009 | Arakaki et al. |
| 7,577,496 B2 | 8/2009 | Walker et al. |
| 7,581,676 B2 | 9/2009 | Skor et al. |
| 7,641,113 B1 | 1/2010 | Alvarez et al. |
| 7,677,450 B1 | 3/2010 | Rajewski |
| 7,690,562 B2 | 4/2010 | Haney et al. |
| 7,720,709 B1 | 5/2010 | Langer et al. |
| 7,721,958 B2 | 5/2010 | Belfer et al. |
| 7,748,619 B2 | 7/2010 | Martin et al. |
| 7,753,259 B1 | 7/2010 | Taylor et al. |
| 7,774,233 B2 | 8/2010 | Barber et al. |
| 7,784,682 B2 | 8/2010 | Taylor et al. |
| 7,861,927 B2 | 1/2011 | DeGironemo |
| 7,934,646 B2 | 5/2011 | Yang |
| 8,038,059 B2 | 10/2011 | Martin et al. |
| 2002/0116266 A1 | 8/2002 | Marshall |
| 2004/0129778 A1 | 7/2004 | Ota et al. |
| 2004/0225553 A1 | 11/2004 | Broady et al. |
| 2005/0145692 A1 | 7/2005 | Tokizawa |
| 2005/0156027 A1 | 7/2005 | Munari |
| 2005/0205666 A1 | 9/2005 | Ward et al. |
| 2005/0211768 A1 | 9/2005 | Stillman |
| 2006/0124733 A1 | 6/2006 | Matthews |
| 2006/0206376 A1 | 9/2006 | Gibbs et al. |
| 2006/0293783 A1 | 12/2006 | Hand et al. |
| 2007/0026916 A1 | 2/2007 | Juds et al. |
| 2007/0063026 A1 | 3/2007 | Mamaropolos et al. |
| 2007/0125846 A1 | 6/2007 | Hemingway et al. |
| 2007/0138262 A1 | 6/2007 | Lai |
| 2007/0138266 A1 | 6/2007 | Kameda et al. |
| 2007/0170249 A1 | 7/2007 | Rademacher |
| 2007/0252003 A1 | 11/2007 | Goldring et al. |
| 2007/0272743 A1 | 11/2007 | Christie et al. |
| 2007/0298405 A1 | 12/2007 | Ebrom et al. |
| 2008/0093444 A1 | 4/2008 | Chung et al. |
| 2008/0116263 A1 | 5/2008 | Kameda et al. |
| 2008/0153567 A1 | 6/2008 | Juds et al. |
| 2008/0154735 A1 | 6/2008 | Carlson |
| 2008/0183579 A1 | 7/2008 | Avner |
| 2008/0319829 A1 | 12/2008 | Hunt et al. |
| 2009/0032367 A1 | 2/2009 | Anthome |
| 2009/0321515 A1 | 12/2009 | Turner |
| 2010/0084421 A1 | 4/2010 | Lazalier et al. |
| 2010/0125362 A1 | 5/2010 | Canora et al. |
| 2010/0131096 A1 | 5/2010 | Koyano |
| 2010/0262282 A1 | 10/2010 | Segal et al. |

OTHER PUBLICATIONS

"Discover OnPremise for Retail—Rapid Business Insights for Retail"; http://www.omniture.com/en/products/multichannel_analytics/discover_onpremise_retail.

METHOD FOR MEASURING EFFECTIVENESS OF SAMPLING ACTIVITY AND PROVIDING PRE-MARKET PRODUCT FEEDBACK

RELATED APPLICATION

This application claims the priority of, and hereby incorporates by reference, provisional application Ser. No. 61/089,346 filed Aug. 15, 2008.

TECHNICAL FIELD OF THE INVENTION

The present method relates to the field of product promotional activities. Particularly, the present method relates to accurately measuring the effectiveness of a promotional event based on consumer purchases tied to product sampling events, and using promotional effectiveness data to optimize the value of future sampling events. The present method additionally relates to providing immediate consumer feedback regarding preferred product qualities, and using the consumer feedback to adjust marketing messages and inform retailer and manufacturer business decisions.

BACKGROUND OF THE INVENTION

Consumer packaged goods manufacturers introduce hundreds, or even thousands, of product innovations each year. A favorite marketing activity for introducing these new products to consumers in the market is conducting sampling events. Promotional events, including such product demonstrations and distribution of free samples, have become a valuable tool for emerging companies and existing companies introducing new brands into the already-saturated marketplace. While present methods of implementing product sampling events provide a consumer the ability to participate in a free trial prior to purchase, thereby reducing the risk of purchasing a product they may not enjoy, obvious disadvantages do exist. One such disadvantage of product sampling events is the inability to definitively measure whether the sampling activity caused a shopper to ultimately purchase the product sampled. Another disadvantage of current sampling activity relates to the ability to sample products consistently at hundreds or thousands of locations during a small time period window—such as close to large product launches—given the fact that current sampling activities rely upon scheduling and educating hundred or thousands of human product samplers.

A third disadvantage to current sampling activity is the ability to conveniently (in terms of store operations) merchandise a volume of saleable product in close proximity to the sampling activity, thereby causing a shopper to search for the product if they are interested in purchasing after a product sample has been consumed. Finally, a potential situation even more unpleasant and damaging to a brand image, results from unsanitary conditions due to human interaction with and preparation of the product sample before distribution to the consumer. Particularly in instances where a product must be maintained at cool or warm temperatures, deviation from a consumable range may permanently disincline a consumer from purchasing that product, or any product in the brand, in the future.

In addition to product sampling events, shoppers are similarly familiar with enrollment and participation in customer loyalty card programs entitling members to special promotions, coupons, free trial items, discounts, with the expectation on behalf of both the retailer and the manufacturer that such benefits will bolster loyalties and effect shopping trends. While particular manufacturers may form economic relationships with retailers to have their products included in such customer loyalty card programs, the feedback provided to the manufacturer pertaining to its participation in the program may be confounded by concurrent in-store promotions or consumer incentives. More valuable trends, such as whether a customer has permanently switched from one brand to another because of a promotional event, is limited due to the retailer's divided attentions in serving customers, manufacturers, distributors, advertisers, franchisers, and other interests. Additionally, traditional product sampling events are not closely tied to customer loyalty programs, despite such a relationship having the potential to provide valuable information and services to all involved.

Further, data aggregation pertaining to consumer preferences with regard to product samples to this point has not existed. As is readily apparent, the grand potential for any of these activities—product demonstrations, customer loyalty card activity, and valuable and reliable data aggregation—had yet to be realized to truly derive the data-collection and brand development benefits to provide sampling to consumers and feedback to manufacturers in an effective and unobtrusive manner.

Accordingly, there is a longstanding need for an improved method of measuring a manufacturer's return on investment for a marketing activity specific to sampling, and for determining whether a product introduction into the marketplace has been successful, or predicting whether it will be successful—linking real-time consumer behavior and feedback through their purchasing of a sampled product or rating of product characteristic preferences. In particular, a method for specifically determining whether the execution of a product demonstration results in an immediate or delayed product purchase is needed. Further, the delivery of a consistent brand message through promotional events, and an exciting and innovative manner of piquing a customer's interest inside the retail environment, and, therefore, in close proximity to the opportunity to purchase a product, is required—particularly in the flood of advertising and promotional events often simultaneously occurring for different brands in a single retail location.

The present invention has provided a solution to each of these problems. By incorporating aspects of promotional events, customer loyalty programs, and data aggregation techniques, the presently disclosed method provides a valuable tool to retailers, manufacturers, consumers, advertisers, and others, to understand and influence shopping trends in an effective and novel manner. There is disclosed herein an improved method of providing promotional events and measuring the effectiveness of such events, including determination of preferred characteristics of pre-market items, which avoids the disadvantages of prior devices while affording additional structural and operating advantages.

SUMMARY OF THE INVENTION

There is disclosed herein an improved method for measuring the effectiveness of promotional events in converting product sampling events into consumer purchases, which avoids the disadvantages of prior methods while affording additional structural and operating advantages. Additionally disclosed is a related method of obtaining product preference feedback from consumers, and providing aggregated preference feedback to manufacturers for determining product development and advertising investment.

In one embodiment of the claimed method, the claimed method comprises situating a product sample terminal accessible to a consumer at a retail location. In an embodiment, the product sample terminal includes an identification input unit. In an aspect of an embodiment, the product sample terminal initiates interaction with the consumer by accepting one or more consumer identification parameters from the consumer through the identification input unit. An additional aspect of an embodiment of the claimed method provides for the product sample terminal comprising a product sample storage container supplied with a plurality of product samples and a product sample dispenser for providing one or more of the plurality of product samples to the consumer upon execution of a product sampling event.

Further, an embodiment of the claimed method includes electronically linking a processor to the identification input unit, and matching the one or more consumer identification parameters to a consumer data set previously stored in a database operably coupled to the processor and retrieving at least one consumer characteristic from the consumer data set pertaining to the consumer. In one aspect, the consumer characteristics may inform the processor in executing the product sampling event. The processor additionally assigns one or more product sample attributes to the product sampling event, and stores the product sample attributes in the database corresponding to the consumer data set.

An aspect of an embodiment further includes identifying a consumer at a purchase site by collecting one or more consumer identification parameters and determining whether the consumer purchased a product correlating to the product sample at a purchase site linked to the processor. The processor additionally accepts purchase item data associated with one or more purchased items presented by the consumer at the purchase site and compares purchase item data to the one or more product sample attributes for determining whether the purchase item data matches the product sample attributes for each of the consumer's one or more purchased items.

Subsequently, an aspect of an embodiment of the method comprises aggregating the consumer identification parameters, product sample attributes, and purchase item data in the database, assigning a promotional event value to the product sampling event in the database, and assigning a consumer promotional value to the consumer in the database. Yet another aspect includes using the promotional event value in providing a future promotional event and the consumer promotional value in providing the consumer with the future promotional event.

Another embodiment of the claimed method include operating the product sample terminal as product feedback terminal, including situating a product feedback terminal accessible to the consumer. In an embodiment, the product feedback terminal comprises a consumer input unit. An aspect of an embodiment includes obtaining entries from the consumer pertaining to at least one product preference solicitation through the consumer input unit. An additional aspect includes providing the product feedback terminal with a consumer output unit for presenting product information and the product preference solicitation, and with a processor operably coupled to a database for accepting and manipulating the entries. After or simultaneous with the processor accepting the entries, the processor may assign one or more product preference qualities to a product sample. A further aspect of an embodiment is eliciting entries from the consumer pertaining to the one or more product preference qualities, storing the entries from the consumer in the database, and developing future products according to the stored entries.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF PREFERRED EMBODIMENTS

Figure 1:
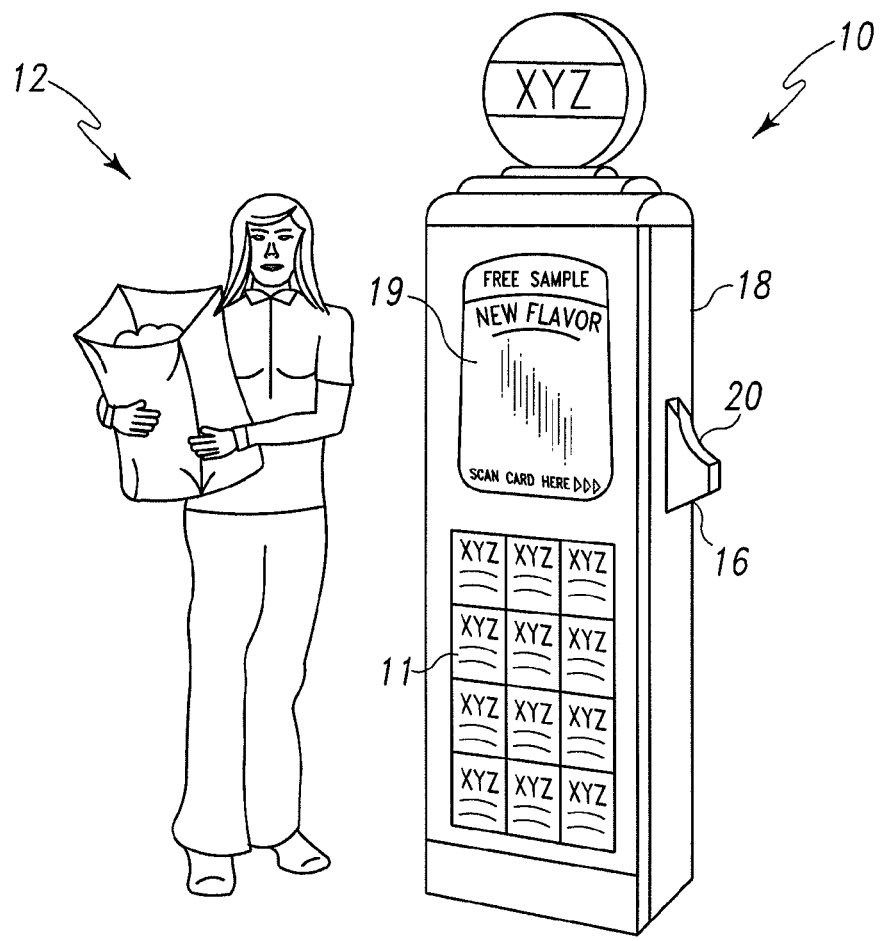
FIG. 1 is an illustration of one embodiment of a product sample terminal with which a consumer interacts to employ the claimed methods.
Figure 1:
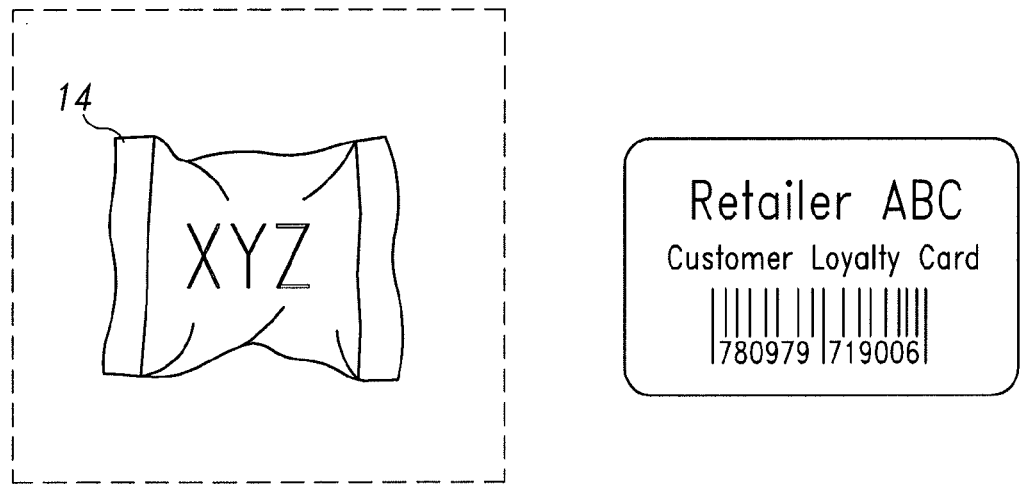

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

Referring to FIGS. 1-8, there is generally illustrated a method for measuring the effectiveness of a promotional event on the purchasing habits of a consumer to whom a product sample has been distributed. Relatedly, also disclosed is a method for obtaining real-time consumer feedback pertaining to preferences in pre-market products, aggregating, and delivering the feedback to a manufacturer to aid the manufacturer in determining in which products it should invest, and with what characteristics.

Figure 7:
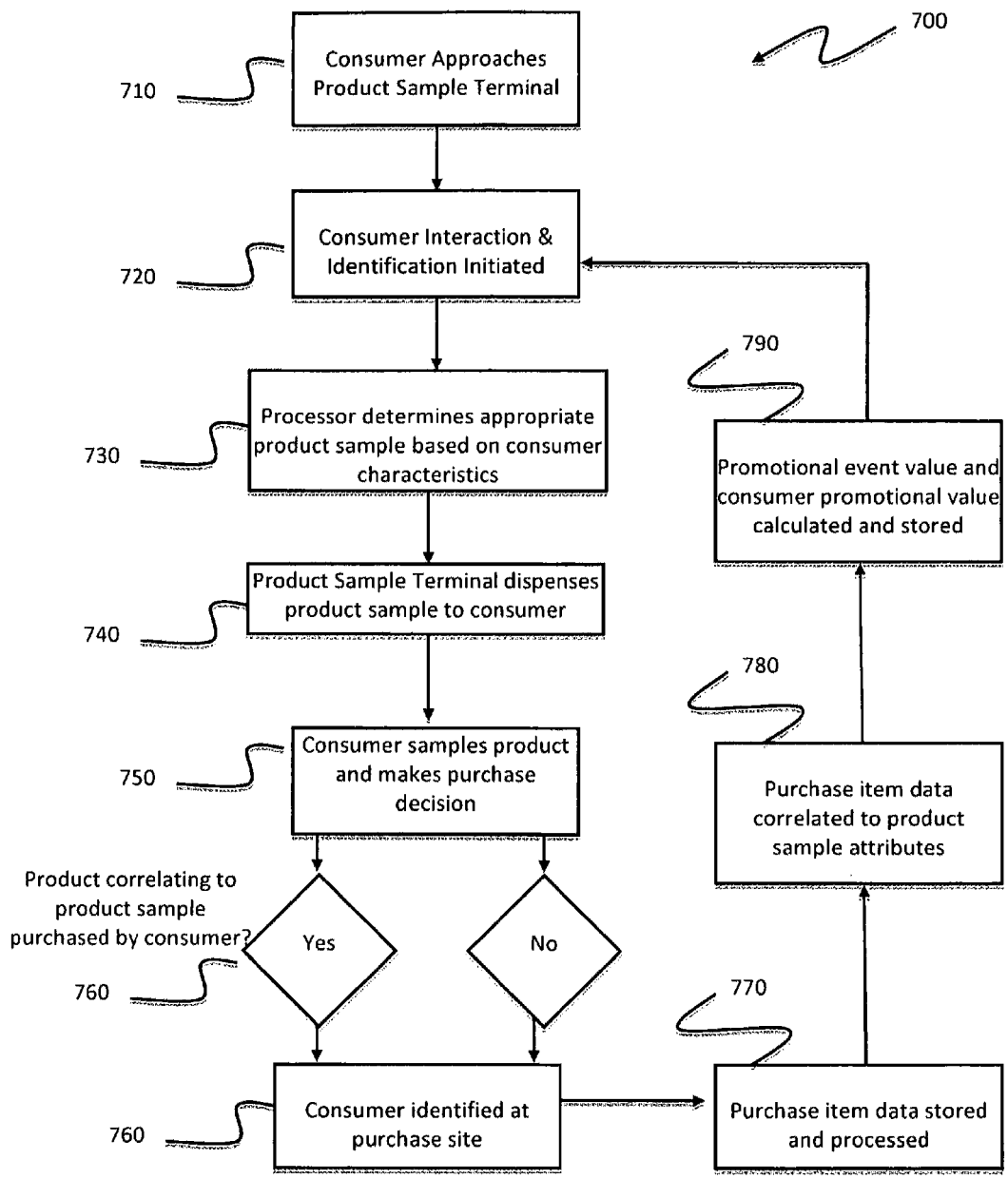
FIG. 7 is a flowchart illustrating one embodiment of the claimed method for measuring the effectiveness of promotional activity.

The method of measuring the effectiveness of a sampling event, one embodiment of which is detailed in FIG. 1 and the flowchart of FIG. 7, involves the interaction of a consumer 12 at a product sample terminal 10. More particularly, the method of measuring sampling event effectiveness comprises the steps of situating the product sample terminal at a point accessible to the consumer, executing a product sampling event 700, including identifying the consumer 720 and dispensing a product sample to the consumer 740, and subsequently identifying the consumer at a purchase site 770, determining whether the consumer purchased an item correlated to the product sampling event 780, and assigning values to the product sampling event and the consumer 790.

Figure 8:
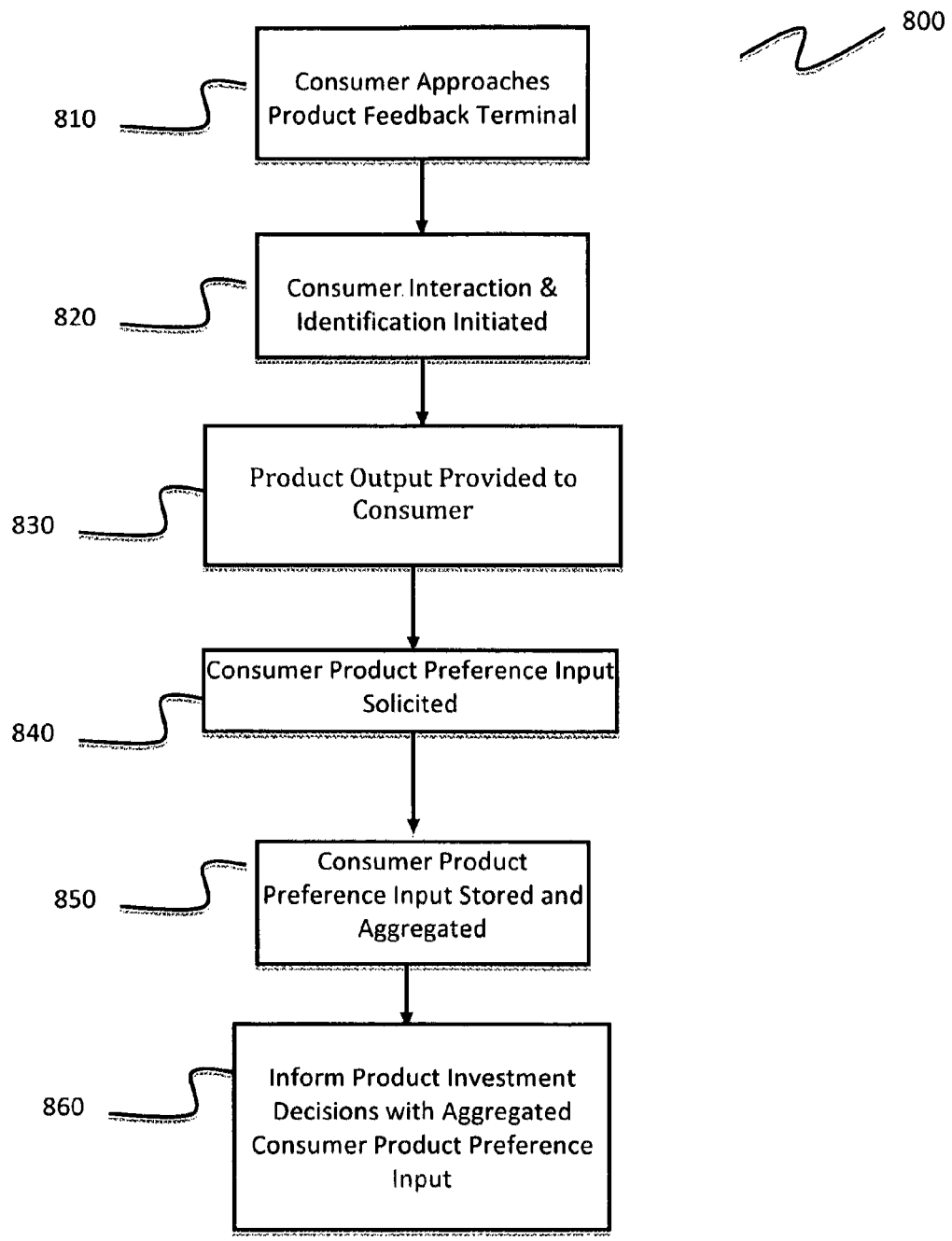
FIG. 8 is a flowchart illustrating an additional embodiment of a claimed method for providing pre-market feedback based upon consumer preferences.

The related method of providing a manufacturer real-time data solicited from a consumer, as illustrated in the flowchart of FIG. 8, comprises situating a product feedback terminal, which may be the same as the product sample terminal 10, at a point accessible to the consumer, eliciting entries from the consumer pertaining to one or more product preference qualities 840, possibly in response to the execution of a product sampling event 830, and storing the consumer entries for development of or investment in future products 860.

The Product Sample Terminal and Components

The product sample terminal 10 is preferably located in a brick-and-mortar retail location, such as a grocery store, as the product sampling event obviously provides for a symbiotic relationship between the consumer, retailer, manufacturer, distributor, advertiser, and other stakeholders in the retail industry. The product sample terminal 10, however, may be situated in a different type of location, such as at trade shows, county fair product booths, concert venues, pop-up stores, etc. Regardless of the particular variety of location at which the product sample terminal 10 is placed, it should generally be along a consumer's shopping path so to encourage interaction with the terminal 10, execution of the product sampling event, and further, in a location where a consumer can purchase product if desired. In a standard retail location, the product sample terminal 10 will be situated in a shopping aisle, but may be situated in any location in a retail environment or any environment where products are available for purchase. Further, the product sample terminal 10 features shelving or other space 11 to merchandise a meaningful volume of full size, purchasable products within arms-reach of the product sample terminal 10. Additionally, the product sample terminal 10 may be operated through connection to an electrical outlet, but may also be battery operated or powered by other means.

After the one or more product sample terminals 10 are situated in a location accessible to the consumer 12 in the retail location, the product sample terminal 10 is equipped with a plurality of product samples. Preferably, the product samples are measured and packaged offsite in packaging of a consistent size and sealed for sanitary and preservative purposes. The product to be sampled, however, may also be provided in bulk containers, to be distributed to consumers in portions of a predetermined amount by weight, size, quantity, or other characteristic onsite. The plurality of product samples are then supplied to the retail location for initial or repeat filling of the product sample terminal as needed, by retail location employees, employees of a promotional marketing firm, or a third party supplier. Depending on the type of product being sampled, the desires of manufacturers, the capabilities of packagers and distributors, and the demographic of targeted consumers, the packaging for the product samples may include an integrated coupon or free product voucher that will further encourage consumers to purchase a product correlating to that sampled after the product sampling event 700 is executed. Alternatively, this coupon or voucher can be dispensed separately from the product packaging, but in coordination with the sampling event 700, depending on the below-detailed consumer promotional value.

With regard specifically to the structure of the product sample terminal 10 as illustrated in FIG. 1, it may be in the form of a mechanical device capable of dispensing a product sample 14 of various sizes, and preferably occupies a small footprint on the floor of the retail location. Alternatively, product sample terminals 10 may be incorporated permanently into store fixtures. In one embodiment, the product sample terminal 10 may comprise an identification input unit 16, a product sample storage container 18, and a product sample dispenser 20.

Figure 2:
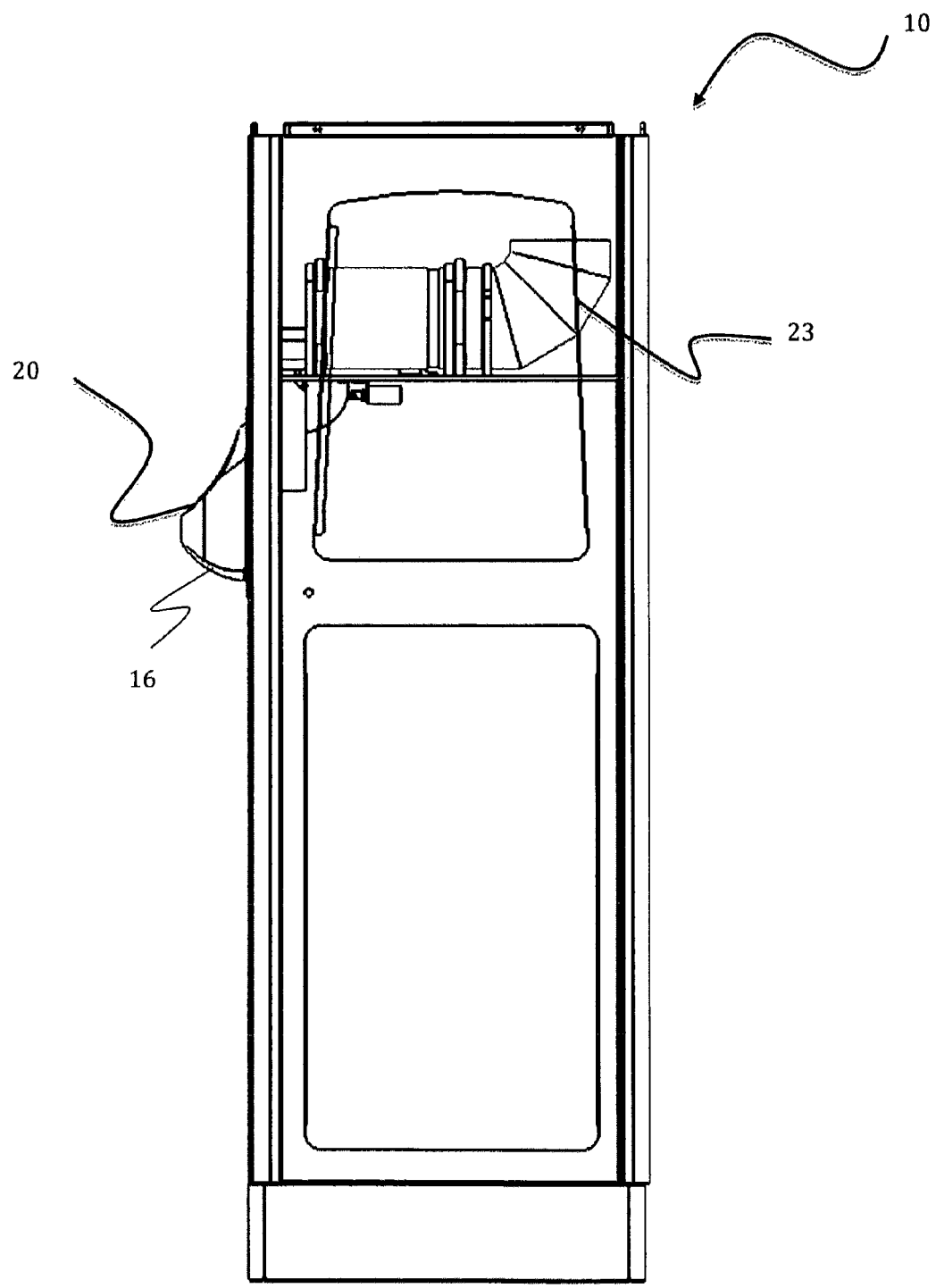
FIG. 2 is a side view of the product sample terminal of FIG. 1, and in particular a side view of one embodiment of a sample dispensing mechanism for providing a sample to a consumer.
Figure 3:
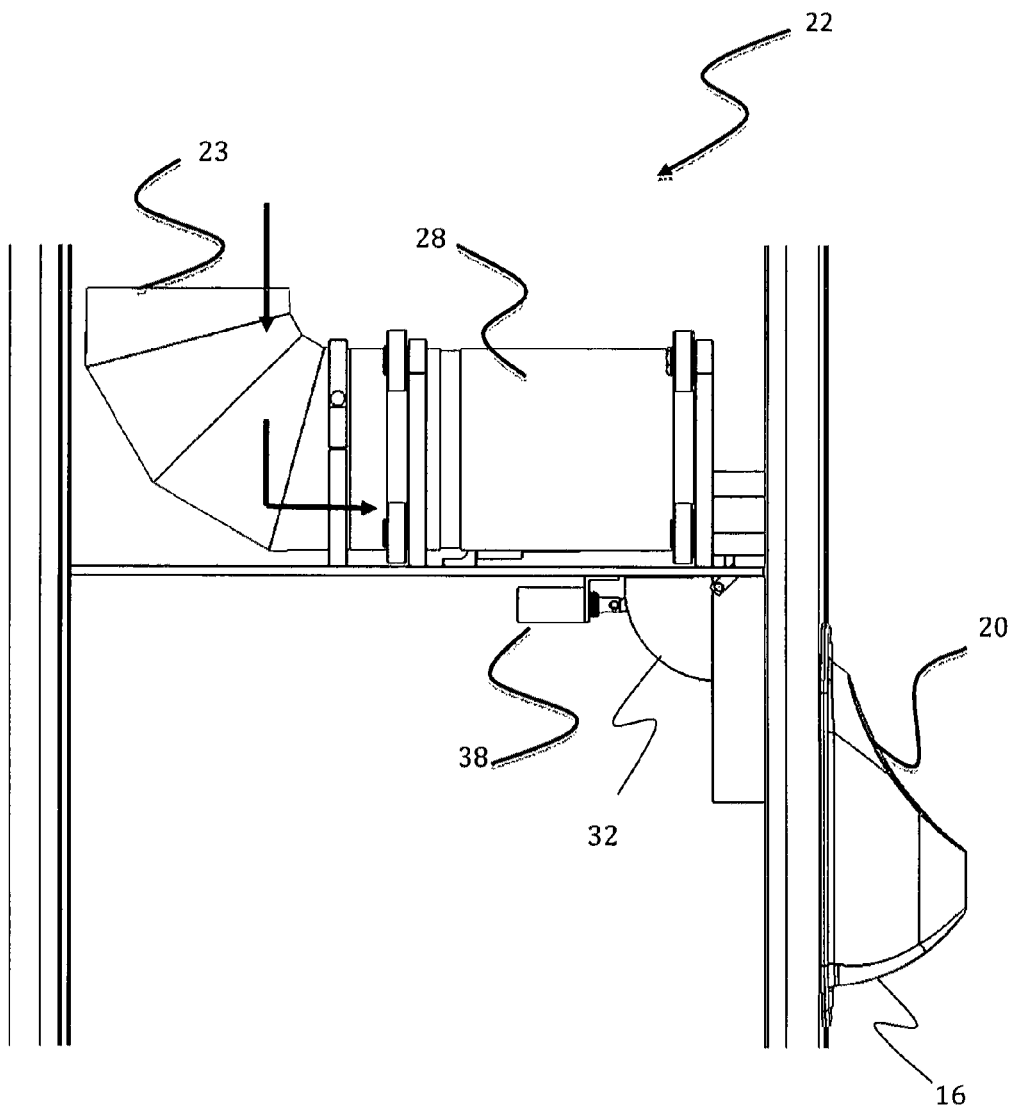
FIG. 3 is an enlarged side view of the sample dispensing mechanism and product sample terminal of FIG. 2.
Figure 4:
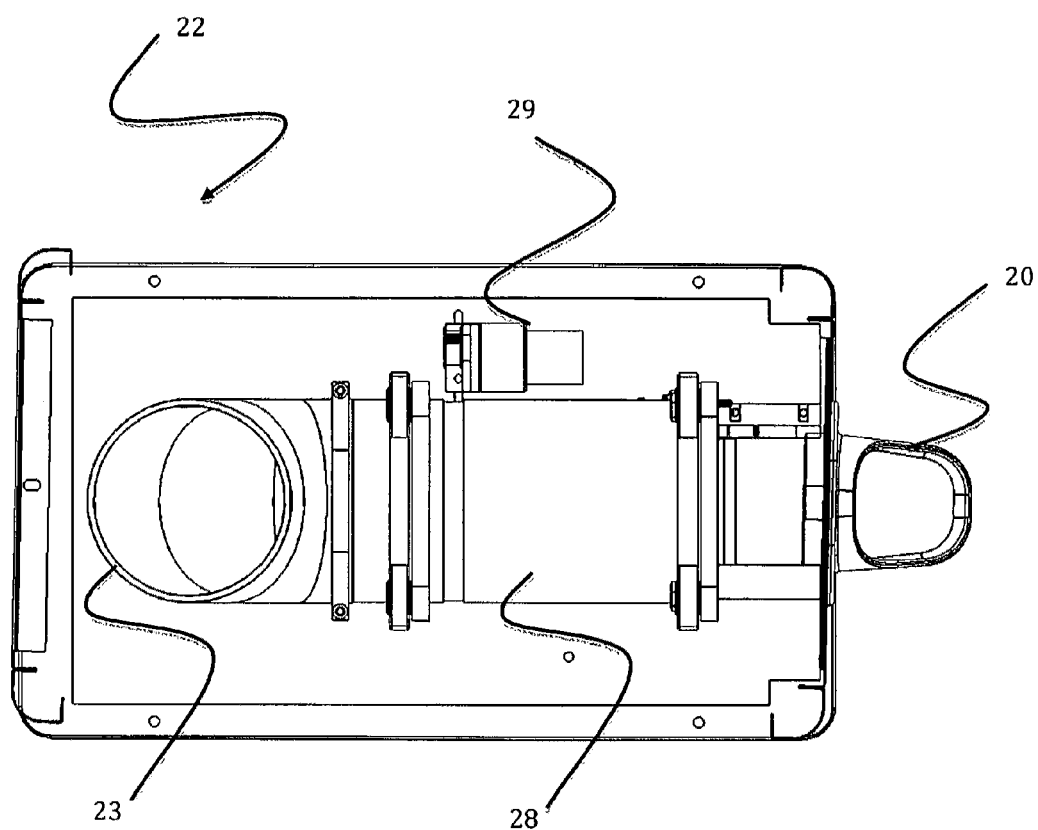
FIG. 4 is a top view of the sample dispensing mechanism and product sample terminal of FIGS. 2 and 3.
Figure 5:
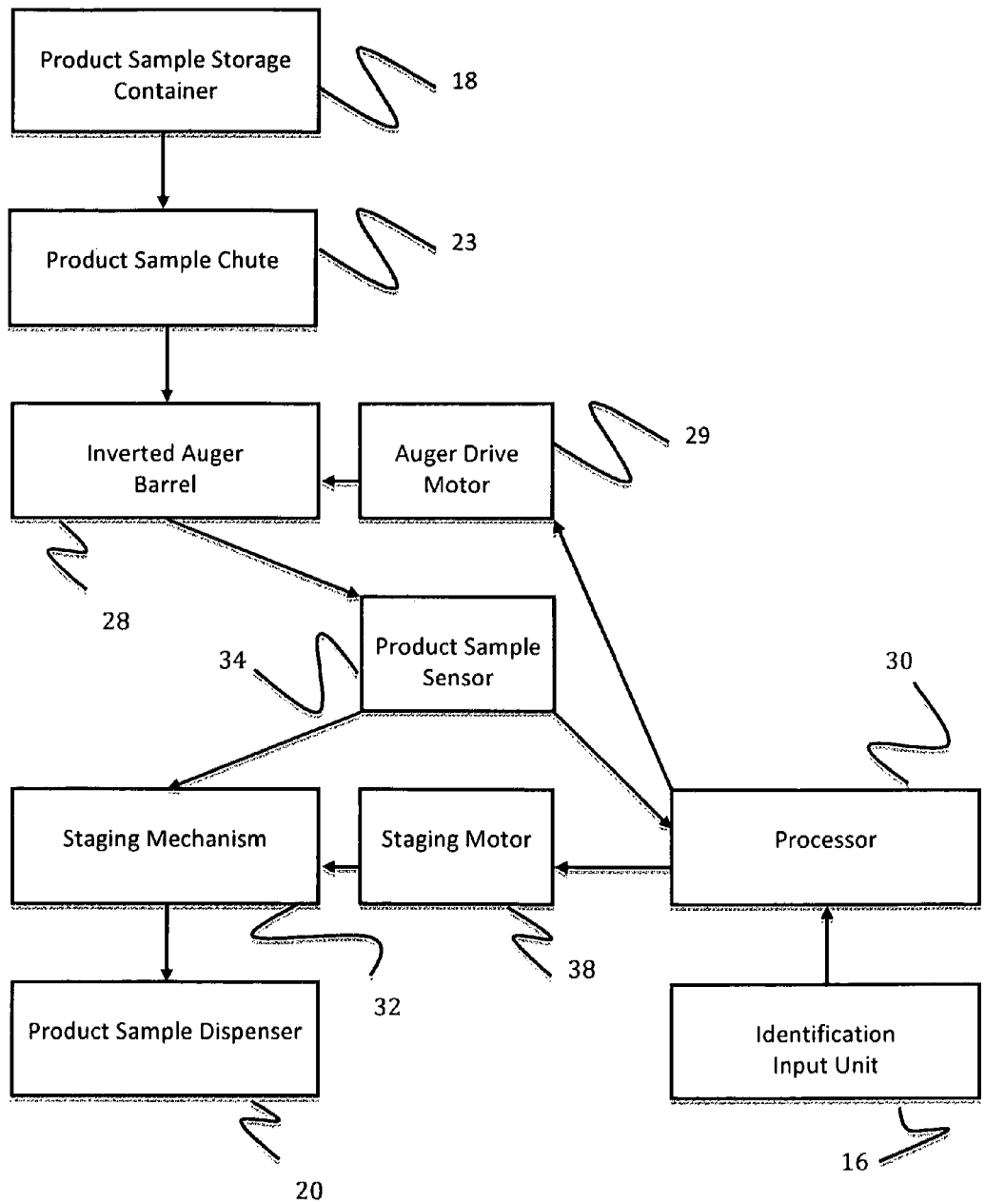
FIG. 5 is a flowchart detailing the operation for dispensing a product sample to a consumer as employed by the product sample terminal of FIG. 1.
Figure 6A:
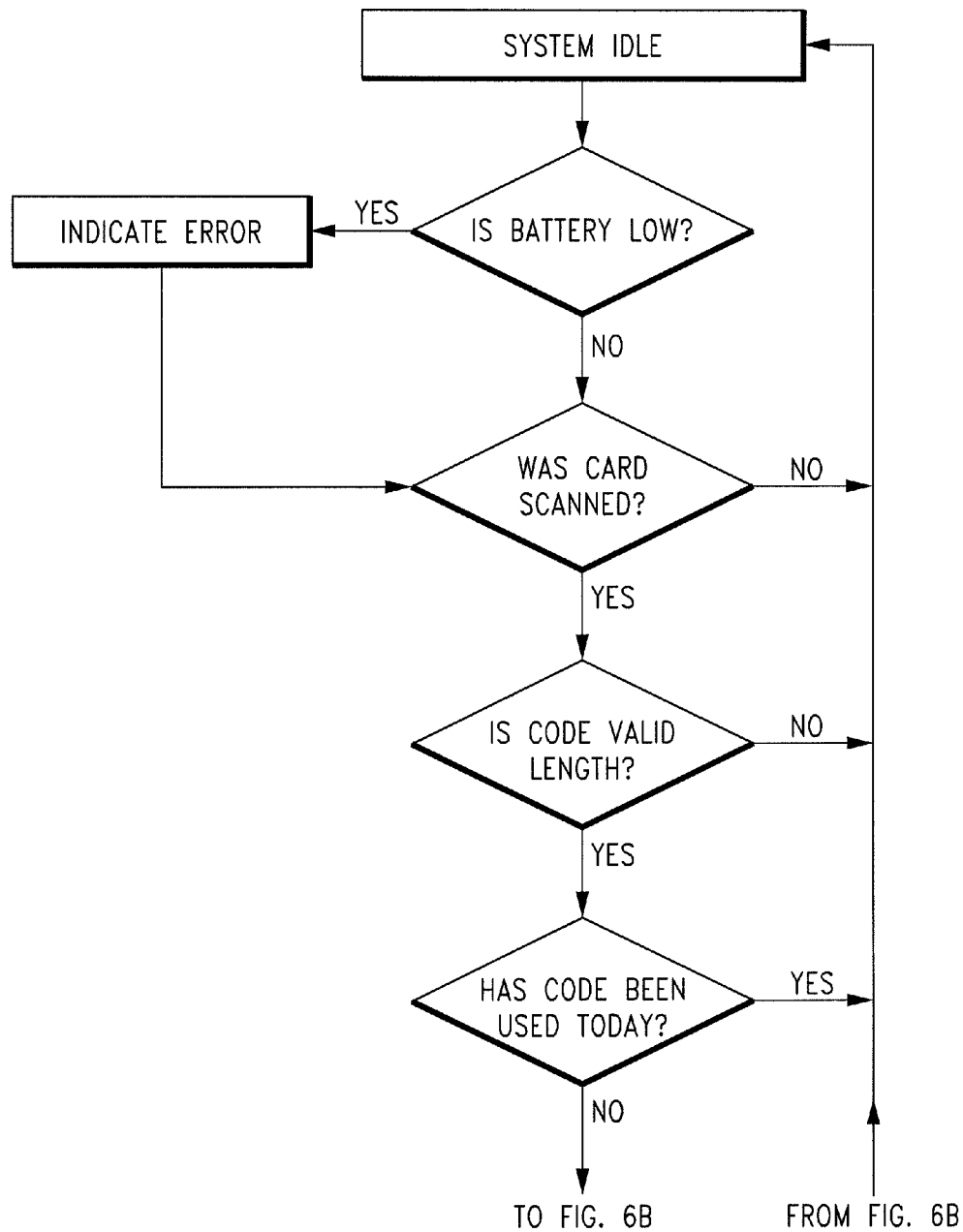
FIG. 6A is a first segment of a flowchart detailing one embodiment of the processor function as employed in the product sample terminal of FIG. 1.
Figure 6B:
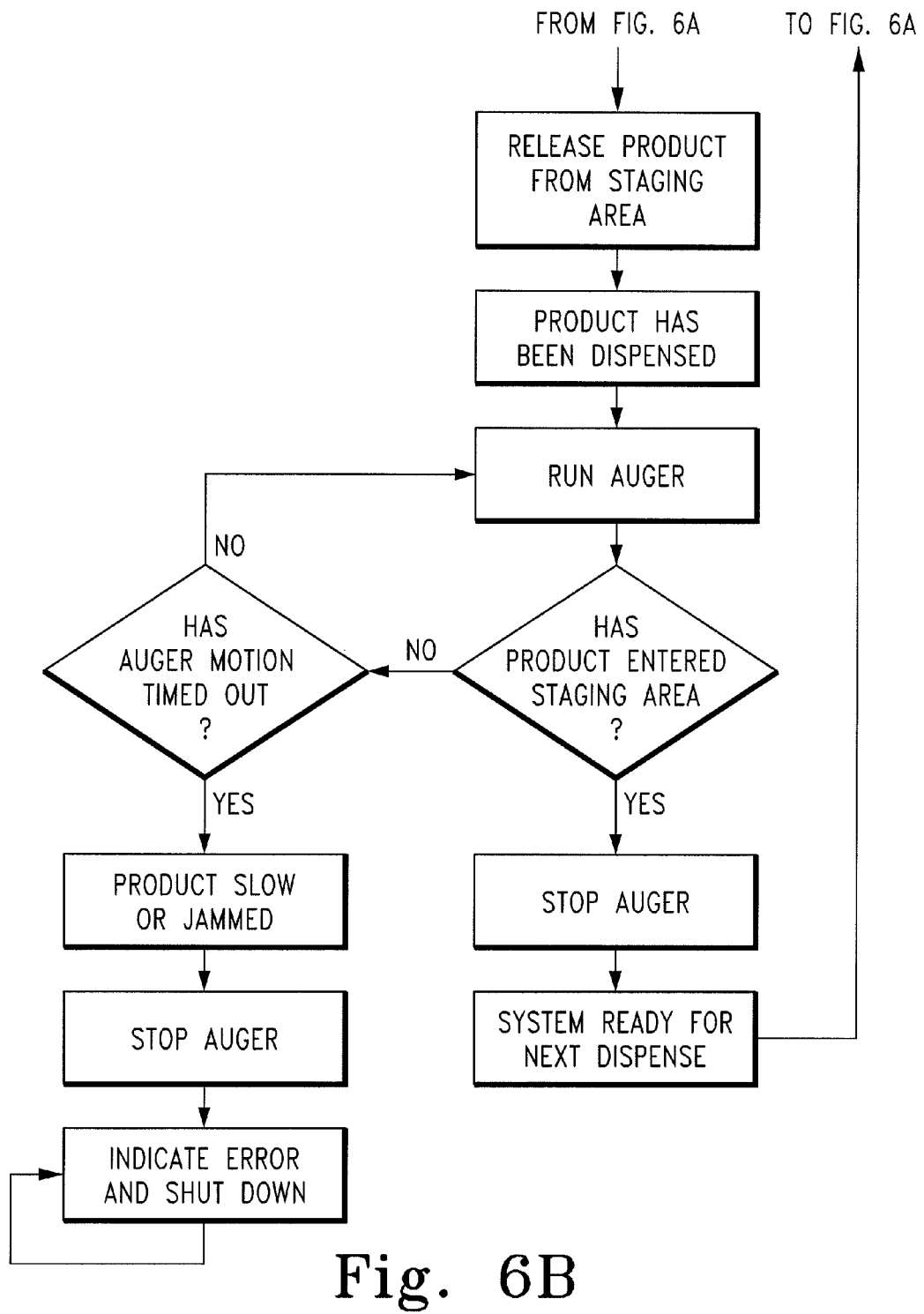
FIG. 6B is the flowchart of 6A continued, the flowchart detailing one embodiment of the processor function as employed in the product sample terminal of FIG. 1.

More particularly, distribution of the product sample 14 is accomplished through the inverted auger mechanism 22 described herein, as illustrated in FIGS. 2-4 and as described in the operations flowcharts of FIGS. 5-6. Product samples 14 are stored in bulk in the product sample storage container 18 at the top of the product sample terminal 10. Gravity helps to feed the product sample 14 to the bottom of the product sample storage container 18 and into the product sample chute 23 which is attached to the inverted auger barrel 28. The inverted auger mechanism 22 uses rotation of a cylindrical auger barrel 28 containing auger flightings of a specified height and spacing, as is known in the art of auger construction, to move product samples 14 in a horizontal direction as the inverted auger barrel 28 is rotated by the auger drive motor 29.

The inverted auger mechanism 22 is a preferable manner of dispensing a product sample 14, in that it allows a great variety of pre-packaged samples (i.e. different size, weights, product characteristics) to be dispensed through a common mechanism. This has obvious advantages to a system designed to dispense a wide variety of product samples. Additionally the inversion of the auger mechanism 22 is preferable to a traditional auger because pinch points are eliminated, thereby decreasing the likelihood of damage to or crushing of the product sample 14. Additionally, the inverted auger mechanism 22 allows the product samples 14 to move in a consistent manner through the inverted auger barrel 28, separating a single product sample 14 with respect to each product sampling event 700 to be dispensed from the plurality of product samples 14 stored in bulk in the product sample storage container 18.

When product samples 14 are initially loaded into the product sample storage container 18, they are gravity fed to the inverted auger barrel 28 through the product sample chute 23. The inverted auger mechanism 22 then enters a priming mode, in which the auger drive motor 29 is activated by a processor 30 until a single product sample 14 is transferred through the inverted auger barrel 28 to the staging mechanism 32, triggering the product sample sensor 34 and signaling the processor 30 to stop the auger drive motor 29.

With the product sample terminal 10 primed, it is now ready to dispense the product sample 14 to the consumer 12. The approaching consumer 12 is recognized by one or more sensing means (not shown), as described in greater detail below. The consumer 12 is identified through use of the identification input unit 16, as described subsequently, and the processor 30 stores the one or more consumer identification parameters received by the identification input unit 16. The processor 30 then signals to the staging mechanism 32—now holding the product sample 14 to be dispensed—that a consumer 12 has been identified and verified. A staging motor 38 is then activated, dropping the product sample 14 into the product sample dispenser 20 for the consumer 12 to grab and consume.

After the product sample 14 has left the staging mechanism 32 the staging motor 38 is re-initialized and returns the staging mechanism 32 to its first position, enabling it to accept a new product sample 14 from the inverted auger barrel 28. When the staging mechanism 32 is in place, the processor 30 notifies the auger drive motor 29 to rotate until a new product sample 14 is dispensed from the inverted auger barrel 28 into the staging mechanism 32, triggering the product sample sensor 34. The processor 30 then receives the signal to stop the auger drive motor 29. The process illustrated in the flowchart of FIG. 6 is continued until all product samples 14 have been dispensed, at which time the processor 30 will signal that all of the product samples 14 have been dispensed, thereby requesting that the product sample terminal 10 be refilled.

It should be understood by persons having ordinary skill in the art that the product sample terminal 10 may essentially take any form capable of distributing prepackaged, pre-measured portions of dry goods, such as cookies, cereals, crackers, chips, and candy, or any other product, including individually packaged liquids such as beverages, lotions, or soaps, and hard goods like razor or toothbrush samples, without the goods being damaged in the distribution channel. Additionally, as is known in the art of food vending mechanisms, the product sample terminal 10 may further comprise a heating or cooling mechanism (not shown) for perishable goods. A heating mechanism may include a timer for appropriately warming or even cooking the perishable goods, so that each product sample 14 is delivered to the consumer 12 warmed as appropriate. It follows that if heating of a product sample 14 is required, cooling of the product sample 14 may be necessary or preferable, as well. Even further, multiple complimentary products may be sampled together—for example, a particular brand of cracker with a particular brand of cheese, or chips with dip.

Further, the product sample terminal 10 may be equipped to not only distribute dry goods, but may also be capable of distributing liquid samples, such as of sodas, flavored waters, teas, or coffees. Such operation would require an alternate or supplemental construction, such as one commonly employed in beverage dispensers found in restaurants, or the common vending machine. An auxiliary purpose for the method defined herein could be the distribution of product samples for non-consumables, such as toothpastes, cleaning supplies, facial tissues, or any other item for which a manufacturer may experience the similar benefit of assessing sales directly related to a product sampling event 700.

While the product sample terminal 10 is presented here as having an electronic interface, it is contemplated that the product sample terminal 10 may otherwise comprise a manned product sample terminal at which a brand ambassador may be located to hand out product samples to the consumer. The steps illustrated in FIG. 7 of identifying a consumer 720, matching the consumer to a database entry, and ultimately determining whether the product sampled by the consumer is purchased on that shopping visit or at a later time 790, apply similarly to the manned product sample terminal 10 as with the unmanned terminal. The electronic components for processing the pertinent sample event information may, in such a case, be in the form of a small keypad, laptop, or other device providing the same functionality and electronic communication capabilities as the unmanned product sample terminal 10.

With continued reference to FIGS. 1 and 7, initiation of a product sampling event 700 may be instigated by equipping the product sample terminal 10 with means for sensing the approach 710 of a consumer towards the product sample terminal. Such sensing means may include one or more infrared proximity detectors, floor sensors that measure change of weight, magnetic fields, or electronic signals and then transmit a signal of approaching consumer to the product sample terminal, a motion detector, ultrasonic detector, or Bluetooth™ detector. The sensing step 710 may additionally be accomplished by detecting when a consumer enters the one or more consumer identification parameters through the identification input unit 16. Upon such sensing of a consumer's presence 710, the product sample terminal 10 may initiate a product sampling event 700 through attracting the consumer's attention by an array of audio-visual output, immediate distribution of a product sample 14, or other means of encouraging the consumer's interaction with the product sample terminal 10.

In a preferred embodiment most clearly illustrated in FIG. 6, the method may further include the step of signaling an alert when the number of product samples 14 in the product sample storage container 18 reaches a certain predetermined refill quantity. Upon reaching a predetermined limit of product samples 14, the alert signal may be sent to a retail monitoring station or remotely to a third party monitoring station so that the product sample storage container 18 may be refilled with product samples. Such monitoring ensures that there occurs no lapse in product sampling events caused by lack of product samples.

Additionally, the method may include an ongoing step of monitoring the function of the product sample terminal 10 and processor 30 for determining whether maintenance is required. For example, if the product sample chute 23 becomes clogged, the electronic communication between the processor 30 and the database is blocked, or other event occurs to jeopardize the functionality of the product sample terminal 10, an alert signal, including the area and details of the problem, may be sent to the monitor so that a maintenance team may be immediately dispatched to remedy the issue. Again, such ongoing monitoring may be important in ensuring that consumers are constantly provided with a sampling event when desired, so to optimize goodwill towards the product sample terminal, ensure continued use, and provide ultimate data aggregation to the manufacturer.

Identifying the Consumer and Accessing the Database

With respect to the identification input unit 16, it may comprise a standard barcode scanner with which any grocery shopper may be familiar. Other forms of identification input units are anticipated 16, however, including magnetic card readers, smart card readers, credit card terminals, biometric scanners, facial or voice recognition devices, radio-frequency identification (RFID) tag readers, or a simple keypad or keyboard with which the consumer may enter a username and password or unique alphanumeric identifier, including a telephone number or loyalty card number. The identification input unit 16 need merely be capable of accepting one or more consumer identification parameters from the consumer 12 to initiate the product sampling event 700, and of being electronically linked to a central processing unit. In a preferred embodiment illustrated in FIGS. 1-3, the identification input unit 16 is located within the underside of the product sample dispenser 20, such that the consumer 12 may wave a customer loyalty card, enabling the identification input unit 16 to accept the associated barcode.

The consumer identification parameters should, individually or as a collection, be capable of being uniquely tied to a particular consumer so as to provide manufacturer and retailer feedback pertaining to that particular consumer's value, as determined partly by the likelihood of that consumer purchasing an item associated with the product sampled. For example, the consumer identification parameters may include biometric data, data associated with the consumer's enrollment in the retailer's customer loyalty program, data associated with membership in a credit card program, a username and/or password previously provided by the consumer, an alphanumeric identifier previously assigned to the consumer, or RFID chip data.

The product sample terminal 10 is supplied with a processor 30, as is well known in the art of electronic devices. The processor 30 may match the one or more consumer identification parameters accepted by the identification input unit to corresponding one or more stored consumer identification parameters. The processor 30 may be a field-programmable gate array, an application-specific integrated circuit, a programmable microcontroller, or any other variety of processor capable of performing the tasks described herein. In one embodiment, the processor 30 links the activities and consumer interaction 730 of the product sample terminal 10 to a database. While the database may actually be stored onsite on a hard disk with which the product sample terminal 10 is equipped, the database is preferably operably coupled to the processor 30 from an offsite or online location, so to prevent loss of data upon damage to the product sample terminal, and optimize the speed, storage, and data aggregation capabilities of the database and processor 30. Where the processor 30 is linked to components requiring wireless electronic communication, the link is preferably a secure one to prevent tampering with the physical products stored in the product sample terminal 10 or with the electronic data transmitted over the link. In particular, the processor 30 may be securely coupled to an offsite server over, for example, a modem, Ethernet, wireless, Bluetooth™, 3G, or GPRS connection.

The memory, and specifically the database, to which the processor 30 is linked is preferably populated with one or more consumer data sets. Such consumer data sets may be provided by the retailer or a third party database maintainer who has previously collected identification tied to a particular consumer, assigned that consumer a unique database entry and one or more consumer identification parameters, and populated the entry with additional consumer characteristics such as demographic and residency information, product purchase history and brand loyalties, food allergies, relational links to other customers, other retail locations the consumer frequents, and even past product sampling events in which the consumer has participated. In certain instances, the consumer characteristics may even include data aggregated from predictive modeling based on purchasing frequency and seasonal purchasing trends. For example, past data collected from the consumer may reveal that the consumer purchases ketchup once per year in July, or increases his or her purchase of baking products from November through January. Although the consumer data sets may be indexed by a customer ID, the data set may be indexed by any suitable parameter.

It is generally anticipated that manufacturers, retailers, and consumers may gain the most benefit from tying a particular consumer's interaction at the product sample terminal with that consumer's participation in a customer loyalty program. In such an instance, the enrollment of the consumer occurs at some point prior to the consumer's encounter with the product sample terminal. In this way, the consumer identification process can be accomplished by accepting a customer loyalty card with which one or more consumer identification parameters are linked. Alternatively, the consumer identification parameters may be collected through an online promotion subscription program, through a credit card or club membership, through the consumer volunteering to participate in product sampling events, or through other means of data aggregation and tracking, as is known in the art. In any of these ways, at least one consumer characteristic may be tied to a consumer identification parameter, the characteristics accessible by the product sample terminal to potentially determine 730 and provide an appropriate product sampling event 700, and further accessible by the manufacturer in analyzing 790 data collected through the product sample terminals 10.

While it is preferred that the particular consumer 12 already be linked to a consumer data set stored in the database operably coupled to the processor 30, the product sample terminal 10 may alternatively prompt the consumer to create a new database entry, and any feedback provided by the consumer is then stored in the database with some means for identifying the consumer in future product sampling events and future purchases. Such a supplemental entry mechanism permits consumers not otherwise associated with a customer loyalty program to participate in a product sampling event 700, providing valuable feedback to the manufacturer. Additionally, the new consumer registration could potentially simultaneously enroll the consumer in the retailer's customer loyalty program.

In an alternate embodiment, the consumer identification step 720 may be skipped entirely, and instead the product sampling event 700 may include providing the consumer with a unique product sample 740. Specifically, the product sample packaging may include a unique identifier, itself, which the consumer is instructed to scan at the purchase point. Upon checkout 770, the consumer may scan the product sample packaging, which triggers the storage 780 of the sampling event 700 at the point of purchase. This consumer behavior may be particularly encouraged if the product sample packaging also includes a coupon for a discounted or free purchasable product or product correlating to the sampled product. Although this embodiment incorporates uncertainty into the system, by requiring the consumer 12 to keep and scan the product sample packaging rather than disposing of it, and though the sample may not be directly tied to the consumer who sampled rather than a consumer who obtains a discarded wrapper, the packaging permits for linking a purchase with a product sampling event 700 even if the consumer 12 does not correlate to a database entry.

In addition to storing the consumer data set, the database may also contain information pertaining to the product sample terminal 10. Such product sample terminal information may include particular terminal identification information, sample distribution information, timestamps, incidence of tampering, or any other suitable terminal data. Although the memory is described herein as constituting a database, the data may alternatively or additionally be stored in any other data storage format, including a generic table in memory, a Microsoft Excel or Access file, or a text file.

Distributing the Product Sample

In its simplest form, after the consumer 12 activates 710 the product sample terminal 10 and provides consumer identification parameters via a customer loyalty card or other identifying stimulus, a product sample 14 is dispensed 740.

In another execution, after the consumer identification parameters are accepted 720 by the identification input unit 16 and the processor 30 matches the consumer identification parameters to a consumer data set stored in the database, the processor 30 may retrieve one or more consumer characteristics from the consumer data set. As described above, these consumer characteristics may include everything from past purchases to demographic information, and may inform the variety, quantity, or other characteristic of product sample distributed to the consumer. For example, if one of the consumer characteristics stored in the database identifies the consumer as having children, the processor may input this data into a preprogrammed instruction set, as is known in the art, and distribute a yogurt sample specifically targeted to toddlers. Another example of consumer characteristic used may be brand loyalty—specifically, if the consumer previously purchased only one brand of chip, the processor may determine that a competing brand should be distributed in an attempt to shift the consumer's purchase habits.

As will be explained in greater detail below, an additional consumer characteristic with which the processor may determine the type, quantity, or quality of product sample to distribute is consumer promotional value. In particular, the database may contain data aggregated from past product sampling events conducted at that or a linked product sample terminal. The database may further contain information regarding whether the consumer purchased the item distributed in the product sample event. Accordingly, if a consumer made past purchases of sampled products, that consumer may be assigned 790 a high consumer promotional value. Depending on how the processor 30 has been programmed, the processor 30 may thus determine that the consumer 12 with high consumer promotional value should be provided with a special coupon or voucher for a free product, with several different varieties of product samples 14, or with more than one of the same product sample 14. A consumer 12 with low consumer promotional value—for instance, a consumer with which no purchase event is associated with a product sampling event—may be provided with a lower quality or smaller product sample 14 due to the low probability that the consumer 12 will purchase the product regardless of its characteristics. Additionally, the product sample terminal 10 may limit the number of product samples received by any particular consumer 12 based on the consumer promotional value or the number of product samples 14 remaining in the product sample storage container 18. Because different product samples 14 may be selected by the processor 30 for distribution to different consumers, it follows that the product sample terminal 10 may be equipped with more than one brand, variety, or size of product sample 14.

As indicated in the description of the product sample terminal's 10 structure, and as illustrated in FIG. 1, the product sample terminal 10 may include an interactive video touch screen 19 that both outputs information and prompts to the consumer 12, and accepts feedback from the consumer 12. In a manner well known to persons having ordinary skill in the art, the product sample terminal 10 may present the consumer with a general product overview, brand and pricing information. Additionally, the interactive screen 19 may solicit immediate feedback from the consumer 12 prior or subsequent to distributing the one or more product samples 14. For example, the interactive screen may solicit input from the consumer regarding flavor preference, preferred size, texture, or other product characteristic, and then distribute the product sample corresponding to the consumer's feedback. Further, after distributing the sample, the interactive screen 19 may ask the consumer 12 whether he or she enjoyed the sample, or whether they would like to sample another variety of the product. The responses to these questions; in addition to questions pertaining to the consumer's favorite flavors, colors, textures, scents, etc. related to the product sample, may then be stored in the database for analysis and appropriate selection of product samples 730 in future product sampling events.

In such a way, the product sample terminal 10 can further increase the likelihood that a consumer will purchase an item correlating to the product sample 14 because of a positive interaction at the product sample terminal and enjoyment of the product sample. In this embodiment of the method, it may further comprise measuring the time spent by the consumer at the product sample terminal. Such time data may provide valuable insight to the manufacturer pertaining to the consumer's likelihood of purchase based upon the amount of product information provided to the consumer, the number of different product samples distributed, and the amount of control granted to the consumer in selecting a product sample to be distributed.

Although the product sample terminal 10 may adjust the manner or type of product distributed to the consumer 12, the product sample terminal 10 may alternatively provide identical product samples to every consumer. Although this embodiment of the method may decrease the number of consumers to which a particular product sampling event appeals, it, too, provides valuable information to the manufacturer pertaining to the general appeal of a particular product. Additionally, this embodiment requires a far less complicated distribution and maintenance system, as it only distributes one product in every consumer interaction.

The disclosed method additionally provides for adjusting the variety, quantity, or other product sample attributes based upon one or more retail location qualities. For example, a retail location quality may include the store's geographic location, the store hours, primary distribution centers, secondary distribution centers, relationships with manufacturers, cost of goods sold, price per sample distributed, retail location traffic, employee work schedules, shopper traffic patterns, or any other suitable retail location qualities. One application of adjusting product sample distribution based on retail location qualities may be limiting the number of samples distributed based on the predicted traffic within a period of time—if a retail location is particularly busy between 4:00 pm through 6:00 pm on weekdays, the processor 30 may determine that each consumer receive only one product sample 14 regardless of the consumer promotional value or any other consumer characteristic. Additionally, retail location qualities may contribute to determining whether a product sample requiring heating or cooling is distributed. In periods of high traffic, the processor 30 may determine it most appropriate to distribute a non-perishable product sample, whereas in lower traffic periods, the greater time required for preparation of a product sample, such as through heating or cooling, may be more appropriate.

Either simultaneous with the execution of the product sampling event 700—i.e., distribution of the product sample to the consumer—or immediately following it, the processor 30 may assign one or more product sample attributes to the product sampling event 700. Such product sample attributes may include the number of product samples dispensed to the consumer, whether the product sample packaging included a coupon, the variety (e.g. size, flavor, texture) of product sample dispensed, the time at which the product sampling event 700 was executed, the purchase price corresponding to a purchasable product correlated to the product sample, or the shelf life or perishability of the product sample. Accordingly, the product sample attributes are stored by the processor in a database entry corresponding to the consumer data set, such that the unique time, date, or other product sample attribute is directly correlated to that specific consumer in the database for future analysis and data aggregation.

To encourage immediate purchase of the purchasable product correlating to a product sample, it is of course preferable to provide such purchasable products in close vicinity of the product sample terminal. In one embodiment, illustrated in FIG. 1, the product sample terminal may itself be equipped with product shelves 11 providing product information, purchase price, and purchasable product. Alternatively, the purchasable product may be in a nearby aisle or otherwise close to the product sample terminal to accommodate the consumer's 12 desire to purchase a product just sampled. Additionally, complimentary products may be positioned with the purchasable product just distributed as a product sample. As mentioned above, crackers with cheese, cookies and milk, and chips and dip make obvious combinations for complimentary products.

Data Collection and Correlation at the Purchase Site

Because the ultimate value of the method lies in determining the effectiveness 790 of a promotional event on a consumer's purchasing decisions 750, it follows that the method must ultimately include determining 780 whether the consumer did, indeed, make a corresponding purchase subsequent to the product sampling event 700. Identifying the consumer 12 at the purchase site is generally accomplished in the same manner as at the product sample terminal 10. For example, identifying the consumer 12 through scanning a customer loyalty card, receiving credit card information, or accepting biometric data, are all appropriate. Alternatively, also as addressed above, the consumer may be identified simply by scanning the product sample packaging in one embodiment of the method. The purchase site is preferably linked electronically to the processor 30 of the product sample terminal 10 and, accordingly, the database in which the consumer identification parameters and product sample attributes were stored previously.

Upon identification of the consumer at the purchase site, purchase site data, such as the time, date, number of items purchased, etc., should be stored 780 in the database. Additionally, with each purchased product scanned by the consumer, the processor should determine whether the consumer purchased a product correlating to the product sample 780. This step is accomplished by the processor 30 accepting purchase item data associated with the one or more purchased items scanned at the purchase site. As is known in the art, the purchased items at a retail location are generally provided with a stock-keeping unit, or SKU, which uniquely identifies the product, its size, flavor, variety, batch number, and a variety of other identifiers. This purchase item data, after being stored in the database, is processed so as to correlate the purchase item data with product sample attributes for determining whether the purchase item data matches the product sample attributes for each of the consumer's one or more purchased items 780. Specifically, the processor aggregates in the database the consumer identification parameters, product sample attributes, and purchase item data.

Accordingly, if the consumer 12 was provided with Cookie Sample A, and purchased Cookie Product A, a match would be indicated in the database. If, however, the consumer instead purchased Cookie Product B, a competitor to Cookie Product A, this data would be registered in the database, as well. It should be noted that the consumer's arrival at a purchase site need not be the same day, same month, or any other time period with respect to the product sampling event 700 for the purchase item data to be registered. To create the most effective data gathering and analysis parameters, a period of time prior and subsequent to the event (for example, four months prior/following the sampling event) will be used to track if the sampled SKU, or correlating SKUs, such as if other flavors of the sampled product, were purchased, or if the consumer purchased a competing product rather than the sampled product.

The temporal component of the purchase will, however, be noted in the database. For example, the fact that the consumer 12 purchased Cookie Product A within the hour of sampling Cookie Sample A will be stored in the database, as would the fact that the consumer, instead, purchased Cookie Product A two months after the product sampling event 700. Relatedly, and because past purchase history by the consumer is also stored in the database, the fact that the consumer purchased Cookie Sample A weekly in the two years preceding the product sampling event 700, will also be noted in the database. All of these items of data may be aggregated and analyzed in various ways 790, as is known in the art of statistical analysis, to provide valuable insight to manufacturers, retailers, advertisers, etc. in targeting consumers and optimizing future promotional activities.

It should further be noted that the purchase site need not necessarily be the site at which the product sampling event 700 was conducted. For example, the purchase site may be an online retailer, with which the consumer identification parameters are tied to the same database accessible by the product sample terminal. Additionally, while the electronic processing described above is preferential in determining whether a consumer purchased a product correlating to a product sampling event 700, alternative means of determining such a correlation are anticipated, as well. In one variation, a consumer may be asked by a retail location employee, a manual payment terminal entry, an email, phone call, or even a mail-in form, if their purchase decision 750 was affected by the product sampling event 700.

Assignment of Promotional Event Values and Consumer Promotional Values

Subsequent to aggregation 780 of the consumer identification parameters, product sample attributes, and purchase item data, the processor 30 may assign 790 a promotional event value to the product sampling event 700 in the database. More particularly, this promotional event value quantifies the number of consumers who were presented with the product sampling event 700 and purchased a product correlating to the product sampling event 700. More valuable than present promotional data analysis, which generally ties sales increases with timing of promotional events and may be skewed by unrelated factors, the direct association between the product sampling event 700 with a product purchase provides specific effectiveness feedback to manufacturers. This effectiveness not only assists manufacturers in planning future promotional events, but also assists in determining valuable product lines and in developing new products.

The method of measuring effectiveness is also more valuable than distribution of coupons, without product samples—one common promotional mechanism currently in use. In using a coupon, a consumer is essentially showing their proclivity for saving money, whereas in purchasing a product previously sampled, the consumer is making the far more bold assertion that they like a particular product. Particularly where the data shows that a consumer previously purchased a competing brand of product, the tying of a promotional event to a related purchase illustrates that the consumer prefers the product sampled over the brand to which they were previously loyal. Further, such aggregation may demonstrate that a new product has added new consumers to the category—such that the product has caused the category to grow—obviously constituting valuable data in determining the success of a product line.

Beyond measuring the effectiveness of a promotional event over all consumers to which the event was offered, the presently disclosed method also provides a means for assigning a consumer promotional value 790 to a particular consumer. Specifically, on a local scale, the consumer's likelihood to purchase a product based on their being offered a product sampling event 700 provides manufacturers a means of rating customers. A manufacturer, through analysis of the database, may cause the product sample terminal 10 to be programmed such that consumers with a consumer promotional value above a certain limit, are provided with higher value samples or a greater quantity of samples, because it is more likely the consumer will convert the product sampling event 700 into a sale. Conversely, consumers with a relatively low consumer promotional value may be offered fewer samples in a particular period, or samples costing the manufacturer less to provide, due to the low probability that the consumer will purchase a product because of a product sampling event 700. In this way, consumer promotional values may be incorporated as one of the consumer characteristics on which the processor relies for instructions in dispensing 740 product samples. The value of this process of product sampling optimization is obvious, providing valuable consumer feedback to the manufacturer, and high quality goods and hands-on control of product distribution to the consumer.

This aggregated data, including the promotional event values and the consumer promotional values, may be packaged in countless ways as valuable products to manufacturers and others. As is readily understood in the field of data aggregation and statistical analysis, the database may be analyzed in the context of numerous parameters, such as consumer demographics, product lines, seasons, socioeconomic conditions, to assist manufacturers in making investment decisions in ways not before available in the field of sampling. Additionally, retail locations, wholesalers, or distributors may pay a data aggregator for the linked database, but may instead pay a fee for the raw customer sampling data.

Method of Providing Consumer Feedback for Pre-Market Items

In a manner that may or may not be identical to that previously described, but in which the data may be used for an alternate purpose, there is also disclosed herein a method for providing data to manufacturers, retailers, advertisers, distributors, etc., the feedback being solicited from a consumer regarding product preferences. In particular, in one embodiment a product feedback terminal—which may be structurally the same to the product sample terminal—is situated in a retail location so to be accessible to a consumer. In operation, the product feedback terminal solicits product preference input from a consumer through a consumer input unit. The consumer input unit may comprise the same interactive video screen 19 described previously, a keyboard or keypad interface, a voice recognition response recorder, or any other appropriate mechanism for obtaining consumer responses. Additionally, the product feedback terminal should be equipped with a consumer output unit, such as an audio-visual interface, which may present product information and elicit responses from the consumer.

A processor 30 is operably coupled to a database, either offsite or contained in a hard disk with which the product feedback terminal is equipped, for accepting and manipulating consumer feedback 850. The processor additionally assigns product preference qualities to a product sample, where the product sample need not necessarily be physically dispensed to the consumer, but qualities of which may be described and illustrated through the consumer output unit. Such product preference qualities may include flavor, color, texture, size, packaging, or any other characteristics appropriately assigned to a product sample.

The product feedback terminal then elicits 840 entries from the consumer through the consumer input unit pertaining to each of the one or more product preference qualities. For example, the consumer may be asked to rate in order of most preferred a variety of fruit flavors for popsicles. The consumer's entries are then stored in the database, and aggregated across all consumer entries 850. In an embodiment, the product feedback terminal may also distribute a product sample by executing a product sampling event 700 in a manner identical to that described above. The consumer may then be asked for additional entries regarding their like or dislike of the product sampled, whether the flavor was as they expected, whether they would purchase the product, etc.

This embodiment of the claimed method is likely most beneficial in testing different marketing messages for products in the retail pipeline. Specifically, manufacturers, advertisers, retailers, etc. may test the efficacy of a marketing message through the measurement of feedback or product sampling events. For example, if data is collected amongst 1,000 product feedback terminals, half touting a product with "50% More Fiber" and the other half advertising the same product as, "Improved Taste", an assessment as to the effectiveness of a marketing message can be made in considering the number of consumers who approached the terminals, accepted a product sample, or were otherwise interested by the message.

Further, this embodiment of the claimed method is relevant to a manufacturer's decision-making regarding pre-market items. By obtaining aggregated data regarding preferred flavors, descriptions, colors, or other qualities, and immediately updating the database as appropriate, the manufacturer can make informed decisions regarding new product investments 860. Additionally, decision-making does not have to await the conclusion of the protracted surveying processes currently in use. Instead, the dynamic database-building provided in the presently disclosed method allows for a manufacturer to determine when and where to invest in development of certain products, based on real-time user feedback. Such a method also assists retailers in determining allocation of shelf-space and whether to form relationships with particular manufacturers.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A method for measuring an effectiveness of a product sampling event, comprising:
  providing a product sample terminal including:
   i) an identification input unit accept a consumer identification parameter from a consumer that identifies the consumer, the identification input unit being operably coupled to a processor;
   ii) a product sample storage container receive a plurality of product samples; and
   iii) a product sample dispenser dispense at least one of the product samples to the consumer upon execution of a product sampling event;
  matching the consumer identification parameter to a consumer data set stored in a database operably coupled to the processor;
  retrieving a consumer characteristic from the consumer data set pertaining to the consumer, wherein the consumer characteristic provides instructions to the processor to execute the product sampling event;
  assigning a product sample attribute to the product sampling event; and
  causing the product sample attribute to be stored in the database corresponding to the consumer data set;
  determining whether the consumer purchased a product corresponding to the product sample at a purchase site;

accepting purchase item data associated with the purchased item presented by the consumer at the purchase site;

comparing purchase item data to the product sample attribute to determine whether the purchase item data matches the product sample attribute for the purchased item;

aggregating the consumer identification parameter, product sample attribute, and purchase item data;

assigning a promotional event value to the product sampling event.

2. The method of claim 1, further comprising registering a new consumer to cause the addition of a new consumer data set is added to the database.

3. The method of claim 1, wherein the product sampling event further includes sensing the consumer approaching the product sample terminal.

4. The method of claim 3, wherein the step of sensing the consumer approaching the product sample terminal is performed by an infrared proximity detector.

5. The method of claim 3, wherein the step of sensing the consumer approaching the product sample terminal is caused by input of the consumer identification parameter through the identification input unit.

6. The method of claim 3, wherein the step of sensing the consumer approaching the product sample terminal is performed by a motion detector.

7. The method of claim 3, wherein the step of sensing the consumer approaching the product sample terminal is performed by a Bluetooth detector.

8. The method of claim 1, wherein the consumer identification parameter includes data associated with the consumer's enrollment in a customer loyalty program.

9. The method of claim 1, wherein the consumer identification includes data associated with a credit card of the consumer.

10. The method of claim 1, wherein the consumer identification parameter includes a username entered by the consumer through the identification input unit.

11. The method of claim 1, wherein the consumer identification parameter includes an alphanumeric identification entered by the consumer through the identification input unit.

12. The method of claim 1, wherein the consumer data set includes demographic information relating to the consumer.

13. The method of claim 1, wherein the consumer data set includes product purchase history relating to the consumer.

14. The method of claim 1, wherein the consumer data set includes a past product sampling event associated with the consumer.

15. The method of claim 1, wherein the product sample attribute includes a time at which the product sampling event was executed.

16. The method of claim 1, wherein the product sample attribute includes a quantity associated with the at least one product samples dispensed to the consumer.

17. The method of claim 1, wherein the product sample attribute includes a purchase price corresponding to a purchasable product corresponding to the product sample.

18. The method of claim 1, wherein the product sample attribute includes a shelf life associated with the product sample.

19. The method of claim 1, further comprising presenting the consumer with information relating to the product sample dispensed from the product sample terminal through an audio visual unit.

20. The method of claim 1, further comprising the step of measuring an amount of time the consumer interacts with the product sample terminal.

21. The method of claim 1, further comprising retrieving a retail location quality from the database pertaining to a retail location where the product sample terminal is located.

22. The method of claim 21, wherein the retail location quality includes hours of operation of the retail location.

23. The method of claim 21, wherein the retail location quality includes a list of preferred manufacturer products.

24. The method of claim 1, further comprising refilling the product sample storage container when a quantity of the plurality of product samples reaches a predetermined limit.

25. The method of claim 1, further comprising determining whether the product sample terminal requires maintenance.

26. The method of claim 1, wherein the processor is operably coupled to the database via a secure data link.

27. The method of claim 1, wherein the product sample terminal further includes a product display for showcasing a purchasable product corresponding to the product sample.

28. The method of claim 1, wherein the product sample terminal further includes a product display for showcasing a purchasable product complimentary to the product sample.

29. The method of claim 1, wherein the product storage container includes a heating mechanism.

30. The method of claim 1, wherein the product storage container includes a cooling mechanism.

31. The method of claim 1, wherein the processor is further adapted to calculate a probability of purchase value from the consumer characteristic and the product sample attribute prior to executing the product sampling event.

32. The method of claim 31, wherein the processor is further adapted to adjust the product sampling event based on the probability of purchase value.

33. The method of claim 1, further comprising equipping each of the plurality of product samples with a coupon redeemable by the consumer at a location of the product sample terminal.

34. The method of claim 1, further comprising causing the storing of purchase item data in the database.

35. A method for providing data solicited from a consumer comprising:

providing a product feedback terminal that includes:
  i) a consumer input unit receive an input from the consumer relating to a product preference solicitation;
  ii) a consumer output unit present product information and the product preference solicitation; and
  iii) a processor operably coupled to a database and accept and manipulate the input and further adapted to assign a product preference quality to a product sample;

eliciting the input from the consumer relating to the product preference quality; and causing the storing of the input from the consumer in the database.

36. The method of claim 35, wherein the product feedback terminal further includes:
  iv) a product sample storage container hold a plurality of product samples characterized by at least the product preference quality; and
  v) a product sample dispenser dispense at least one of the product samples to the consumer upon execution of a product sampling event.

* * * * *